(12) United States Patent
Lee et al.

(10) Patent No.: US 9,151,992 B2
(45) Date of Patent: Oct. 6, 2015

(54) COLOR FILTER SUBSTRATE AND LIQUID CRYSTAL DISPLAY DEVICE INCLUDING THE SAME

(71) Applicant: LG Display Co., Ltd., Seoul (KR)

(72) Inventors: Min-Kyung Lee, Seoul (KR); Jae-Kyun Lee, Goyang-si (KR); Seung-Ryull Park, Goyang-si (KR); Kyung-Mo Son, Paju-si (KR); Ji-Hye Lee, Paju-si (KR); Jeong-Gi Yun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 148 days.

(21) Appl. No.: 13/727,093

(22) Filed: Dec. 26, 2012

(65) Prior Publication Data

US 2014/0085558 A1    Mar. 27, 2014

(30) Foreign Application Priority Data

Sep. 26, 2012   (KR) .................. 10-2012-0107109

(51) Int. Cl.
*G02F 1/1339* (2006.01)
*G02F 1/1343* (2006.01)
*G02F 1/1335* (2006.01)
*G02B 5/20* (2006.01)
*G02F 1/133* (2006.01)

(52) U.S. Cl.
CPC .............. *G02F 1/13394* (2013.01); *G02B 5/20* (2013.01); *G02B 5/201* (2013.01); *G02F 1/13306* (2013.01); *G02F 1/133512* (2013.01); *G02F 2001/13396* (2013.01)

(58) Field of Classification Search
CPC .......... G02F 1/13394; G02F 1/133509; G02F 1/133784; G02F 1/13306; G02F 1/133512; G02F 2001/13396; G02B 5/20; G02B 5/201
USPC ......... 349/106, 110, 123, 129, 130, 141, 155, 349/156

See application file for complete search history.

(56) References Cited

U.S. PATENT DOCUMENTS

| 5,221,981 | A | * | 6/1993 | Kodera et al. | 349/126 |
| 2006/0158600 | A1 | * | 7/2006 | Mun et al. | 349/156 |
| 2007/0035686 | A1 | * | 2/2007 | Iwakabe et al. | 349/141 |
| 2007/0258025 | A1 | * | 11/2007 | Sawasaki et al. | 349/106 |
| 2009/0073371 | A1 | * | 3/2009 | Takeda et al. | 349/156 |
| 2009/0303423 | A1 | * | 12/2009 | Kim et al. | 349/110 |
| 2010/0002172 | A1 | * | 1/2010 | Kim et al. | 349/106 |

* cited by examiner

*Primary Examiner* — Dung Nguyen
*Assistant Examiner* — David Chung
(74) *Attorney, Agent, or Firm* — Fenwick & West LLP

(57) ABSTRACT

A color filter substrate includes a substrate in which a plurality of pixel areas are defined; a black matrix formed on the substrate, and having a plurality of openings in correspondence to the pixel areas; a color filter layer formed on the substrate, and including a red color filter, a green color filter, and a blue color filter that are sequentially arranged in a first direction in correspondence to the pixel areas; and a plurality of first column spacers and a plurality of second column spacers formed over the black matrix, and having different heights, wherein a height of each of the first column spacers is higher than a height of each of the second column spacers, and an arrangement density of the first column spacers is lower than an arrangement density of the second column spacers.

6 Claims, 10 Drawing Sheets

COLOR FILTER SUBSTRATE AND LIQUID CRYSTAL DISPLAY DEVICE INCLUDING THE SAME

CROSS-REFERENCE TO RELATED APPLICATIONS

The present application claims the priority benefit of Korean Patent Application No. 10-2012-0107109 filed in Republic of Korea on Sep. 26, 2012, which is hereby incorporated by reference in their entirety.

BACKGROUND

1. Field of the Disclosure

The present disclosure relates to a liquid crystal display device, and more particularly, to a color filter substrate and a liquid crystal display device including the same.

2. Discussion of the Related Art

A liquid crystal display device has been widely used in various electronics, such as a notebook, a monitor, a TV, etc., since it has a high contrast ratio, is suitable to display moving images, and has low consumption power. Liquid crystal has optical anisotropy in which its molecular structure is thin and long and its molecular arrangement has directivity, and has polarization in which the direction of its molecular arrangement changes according to the magnitude of an electric field when the liquid crystal is in the electric field. The liquid crystal display device displays images using the optical anisotropy and polarization of liquid crystal.

In general, a liquid crystal display device includes a liquid crystal panel fabricated by bonding first and second substrates with a liquid crystal layer therebetween, and electrodes are formed on the facing surfaces of the first and second substrates so that the arrangement of liquid crystal molecules changes by an electric field applied to the facing electrodes to thereby make a difference in transmittance.

The difference in transmittance of the liquid crystal panel is reflected in a combined color when light emitted from a backlight positioned on the back side of the liquid crystal panel passes through a color filter, thereby representing a color image.

A method of fabricating a general liquid crystal display device includes a substrate fabricating process of forming an array substrate and a color filter substrate, a cell process of fabricating a liquid crystal panel, and a module process of integrating the liquid crystal panel with a backlight.

In the substrate fabricating process, operations, such as thin film deposition, photolithography, etching, etc., are repeatedly performed to form an array layer and a color filter layer on the respective substrates. In the cell process, a seal pattern for bonding is formed on one of the array substrate and the color filter substrate, and the array substrate is bonded to the color filter substrate with the liquid crystal layer interposed therebetween to thereby fabricate the liquid crystal panel. In the module process, a polarizer, a driving circuit, etc. are attached onto the liquid crystal panel and then the resultant liquid crystal panel is integrated with the backlight.

Meanwhile, spacers are provided between the array substrate and the color filter substrate in order to maintain a constant distance between the array substrate and the color filter substrate. The spacers are classified into ball spacers and column spacers according to their shapes and arrangement. The ball spacers are formed in such a manner to be distributed on the array substrate or the color filter substrate, and the column spacers are formed through patterning on the array substrate or the color filter substrate. Recently, column spacers have been widely used since they can be easily formed in a desired pattern at a specific location, and the column spacers are formed generally on a color filter substrate requiring a relatively small number of processes.

However, when an external force is applied to a liquid crystal panel, column spacers move, which damages an alignment layer and causes defects. This will be described in detail with reference to a drawing.

FIG. 1 is a cross-sectional view of a conventional liquid crystal display device.

As shown in FIG. 1, a first substrate 10 faces a second substrate 20 with a distance therebetween, and aperture areas AA in which images are displayed and shielding areas SA in which no image is displayed are defined on the first substrate 10 and the second substrate 20.

On the surface of the first substrate 10 facing the second substrate 20, signal lines 12, such as gate lines or data lines, are formed in correspondence to the shielding areas SA, an insulating layer 14 is formed on the signal lines 12, and a first alignment layer 16 is formed on the insulating layer 14. Although not shown in FIG. 1, pixel electrodes are formed in the aperture areas AA on the first substrate 10.

On the surface of the second substrate 20 facing the first substrate 10, a black matrix 22 is formed, a color filter layer 24 is formed on the black matrix 22, and a second alignment layer 26 is formed on the color filter layer 24. Although not shown in FIG. 1, a common electrode is formed on the entire surface of the second substrate 20. Also, column spacers 32 are formed on the second alignment layer 26, in correspondence to the black matrix 22, such that at least one column spacer 32 is formed for each pixel.

Meanwhile, a liquid crystal layer (not shown) is positioned between the first alignment layer 16 and the second alignment layer 26.

FIGS. 2A and 2B are cross-sectional views of the conventional liquid crystal display device when an external force is applied to the conventional liquid crystal display device and after the applied external force is removed.

As shown in FIG. 2A, when an external force is applied to the conventional liquid crystal display device in the direction of an arrow shown in FIG. 2A, the second substrate 20 moves to the right with respect to the first substrate 10. At this time, the column spacers 32 on the second substrate 20 also move to the right, so that the column spacers 32 contact the first alignment layer 16 of the aperture areas AA. The first and second alignment layers 16 and 26 are rubbed or optically aligned in a predetermined direction, and due to the contact with the column spacers 32, the alignment of the first alignment layer 16 changes at the contact area A1 so that the contact area A1 has different alignment from the other area.

Successively, as shown in FIG. 2B, after the external force is removed, the second substrate 20 moves to the left with respect to the first substrate 10 to return to its original state. However, since the contact area A1 of the first alignment layer 16 has a different alignment from the other area, liquid crystal molecules over the contact area A1 are aligned differently from liquid crystal molecules over the other area to thus change transmittance of light. However, since the contact area A1 is not covered by the black matrix 22, light is transmitted in correspondence to the contact area A1 when a black image is displayed, resulting in a recognizable defect.

A structure for preventing such a defect is shown in FIG. 3.

FIG. 3 is a cross-sectional view of another conventional liquid crystal display device. The structure shown in FIG. 3 is the same as that shown in FIG. 1, except for the structure of the black matrix. In the following description, the same elements as those described above will be not described.

As shown in FIG. 3, the width of each black matrix 22 increases to a predetermined size in which the black matrix 22 covers the contact area A1 of the first alignment layer 16. In detail, the width of the black matrix 22 increases to a predetermined size in which the black matrix 22 extends to about 22 to 25 micrometers from both top edges of the column spacer 32 contacting the first alignment layer 16. That is, the width of the black matrix 22 increases by about 15 micrometers or more, compared to the black matrix 22 of the example shown in FIG. 1.

However, the increased widths of the black matrix 22 increase the shielding areas SA to reduce the aperture areas AA, which lowers the aperture ratio and brightness of the liquid crystal display device.

SUMMARY OF THE INVENTION

Accordingly, the present invention is directed to a liquid crystal display device that substantially obviates one or more of the problems due to limitations and disadvantages of the related art.

An object of the present disclosure is to provide a color filter substrate capable of preventing defects due to movement of column spacers to improve an aperture ratio and brightness, and a liquid crystal display device including the color filter substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a color filter substrate includes a substrate in which a plurality of pixel areas are defined; a black matrix formed on the substrate, and having a plurality of openings in correspondence to the pixel areas; a color filter layer formed on the substrate, and including a red color filter, a green color filter, and a blue color filter that are sequentially arranged in a first direction in correspondence to the pixel areas; and a plurality of first column spacers and a plurality of second column spacers formed over the black matrix, and having different heights, wherein a height of each of the first column spacers is higher than a height of each of the second column spacers, and an arrangement density of the first column spacers is lower than an arrangement density of the second column spacers.

In another aspect, a liquid crystal display device includes a first substrate and a second substrate in which a plurality of pixel areas are defined, wherein the first substrate faces and is spaced apart from the second substrate; a plurality of patterns formed on an inner surface of the first substrate facing the second substrate, and making a step height; an insulating layer formed on the plurality of patterns; a black matrix formed on the surface of the second substrate facing the first substrate, and having a plurality of openings corresponding to the pixel areas; a color filter layer formed on the inner surface of the second substrate facing the first substrate, and including a red color filter, a green color filter, and a blue color filter that are sequentially arranged in a first direction in correspondence to the pixel areas; and a plurality of first column spacers and a plurality of second column spacers formed over the black matrix, and having different heights, wherein each first column spacer contacts the insulating layer over one of the patterns, each second column spacer is spaced apart from the insulating layer over another one of the patterns, and an arrangement density of the first column spacers is lower than an arrangement density of the second column spacers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
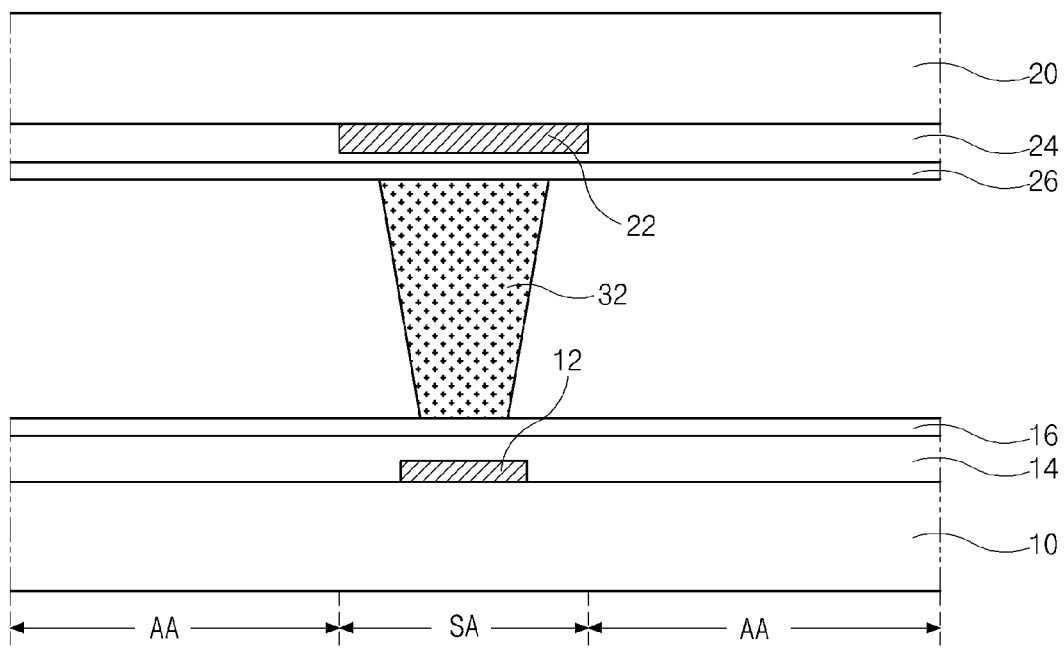
FIG. 1 is a cross-sectional view of a conventional liquid crystal display device.
Figure 2A:
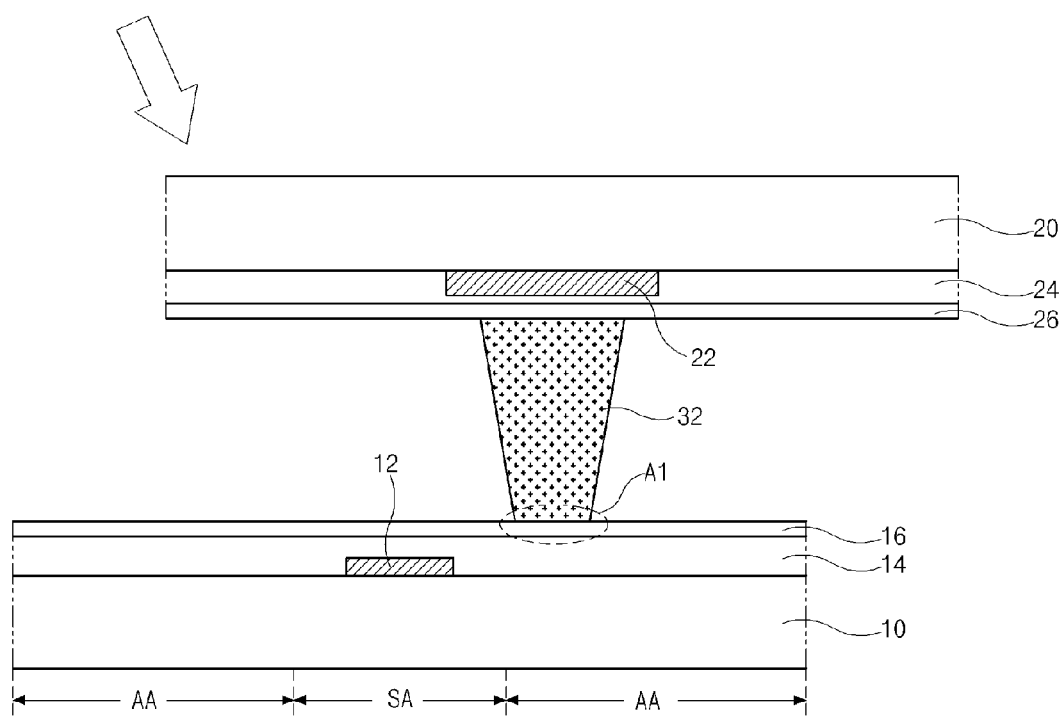
FIGS. 2A and 2B are cross-sectional views of the conventional liquid crystal display device when an external force is applied to the conventional liquid crystal display device and after the applied external force is removed.
Figure 2B:
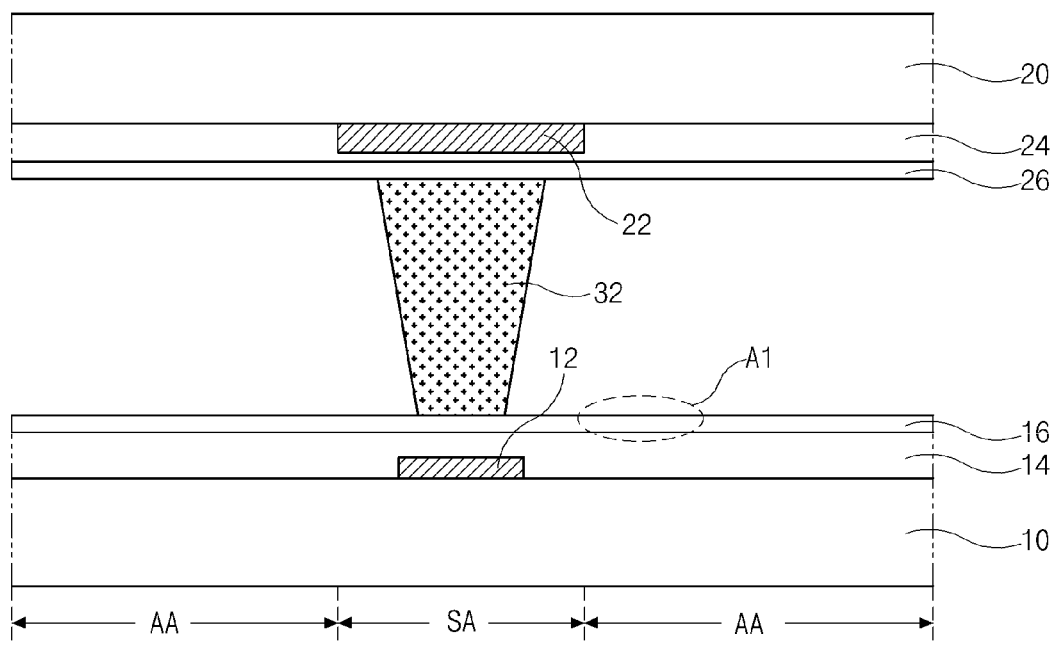
Figure 3:
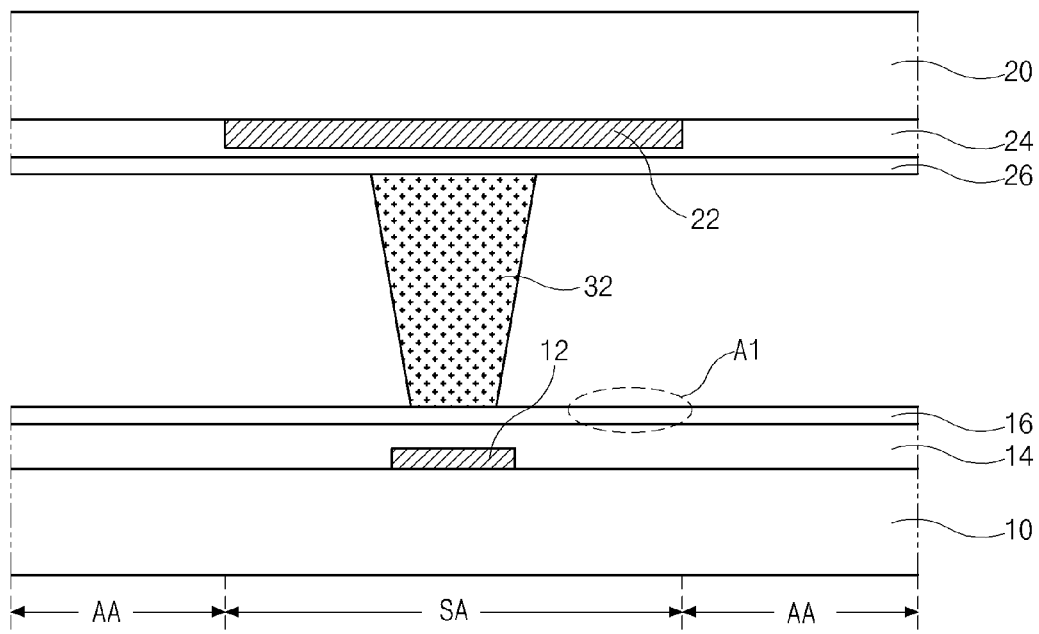
FIG. 3 is a cross-sectional view of another conventional liquid crystal display device.
Figure 4:
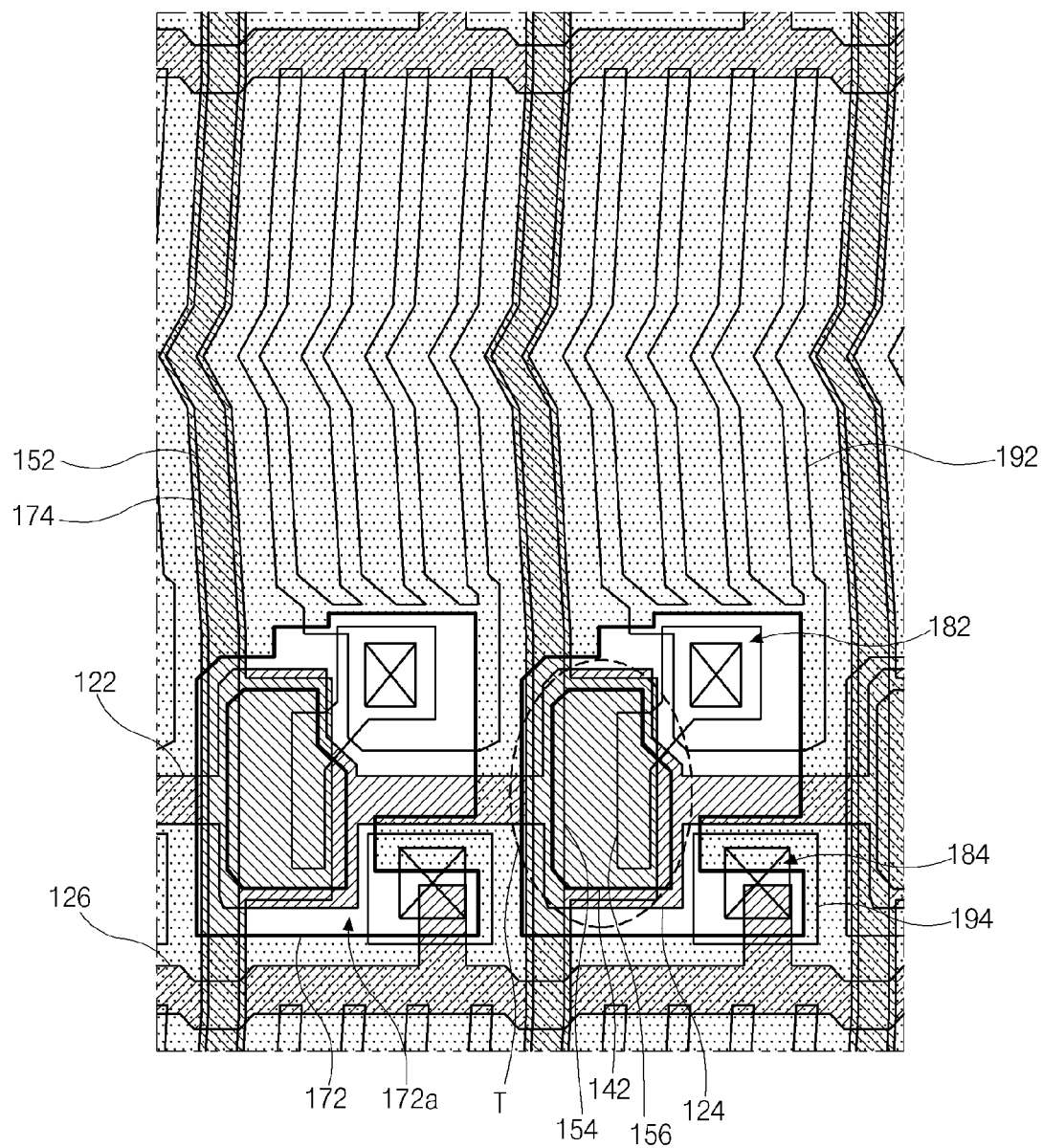
FIG. 4 is a top view of an array substrate of a liquid crystal display device according to an embodiment of the present invention.

FIG. 4 is a top view of an array substrate of a liquid crystal display device according to an embodiment of the present invention.

As shown in FIG. 4, gate lines 122 are formed to extend in a first direction, and gate electrodes 124 are connected to the gate lines 122 on an insulating substrate (not shown). Also, first common lines 126 are formed to extend in the first direction and be spaced apart from the gate lines 122. The gate lines 122, the gate electrodes 124, and the first common lines 126 are formed of a metal material having relatively low resistivity.

A gate insulating layer (not shown) made of an inorganic insulating material, such as silicon nitride or silicon oxide, is formed on the gate lines 122, the gate electrodes 124, and the first common lines 126.

Active layers 142 made of amorphous silicon are formed on the gate insulating layer over the gate electrodes 124.

Data lines 152 extending in a second direction, source electrodes 154 connected to the data lines 152, and drain electrodes 156 spaced apart from the source electrodes 154 are formed on the active layers 142. The data lines 152 cross the gate lines 122 to define pixel areas. A source electrode 154 and a drain electrode 156 are spaced with an active layer 142 therebetween. The data lines 152, the source electrodes 154, and the drain electrodes 156 are formed of a metal material having relatively low resistivity.

In the current embodiment, parts of the data lines 152 are the source electrodes 154, however, parts extending from the data lines 152 may become the source electrodes 154.

Also, an ohmic contact layer (not shown) made of amorphous silicon doped with impurities is formed between the active layers 142 and the source electrodes 154 and between the active layers 142 and the drain electrodes 156.

A gate electrode 124, an active layer 142, a source electrode 154, and a drain electrode 156 configure a thin film transistor T, and the active layer 142 between the source electrode 154 and the drain electrode 156 becomes a channel of the thin film transistor T.

A first passivation layer (not shown) is formed on the data lines 152, the source electrodes 154, and the drain electrodes 156. The first passivation layer is formed of an organic material and has a flat surface.

A common electrode 172 is formed on the first passivation layer. The common electrode 172 is formed of a transparent conductive material, such as indium-tin-oxide (ITO) or indium-zinc-oxide (IZO). The common electrode 172 is formed over the entire surface of the substrate, and has openings 172a in correspondence to thin film transistors T.

Second common lines 174 are formed on the common electrode 172 in such a manner as to contact the common electrode 172 and extend in the second direction. The second common lines 174 overlap the data lines 152 and have a width that is wider than that of the data lines 152. However, the second common lines 174 may have a width that is narrower than that of the data line 152. The second common lines 174 are formed of a metal material having relatively low resistivity. The second common lines 174 have extensions corresponding to the thin film transistors T, and the extensions may overlap the first common lines 126.

A second passivation layer (not shown) is formed on the second common lines 174. The second passivation layer is formed of an inorganic insulating material, such as silicon oxide or silicon nitride, and has a step height due to the lower layer. Also, the second passivation layer has drain contact holes 182 to expose the drain electrodes 156 with the first passivation layer, and also has common contact holes to expose the first common lines 126 and the common electrode 172 with the first passivation layer and the gate insulating layer. The first common lines 126 and the common electrode 172 may have protrusions in correspondence to the common contact holes 184.

A pixel electrode 192 is formed in each pixel area on the second passivation layer. The pixel electrode 192 extends in the second direction, includes a plurality of patterns spaced in the first direction, and contacts a drain electrode 156 through a drain contact hole 182. The pixel electrode 192 is formed of a transparent conductive material, such as ITO or IZO.

The pixel electrode 192 has bent parts at its center portion. As shown in FIG. 4, the pixel electrode 192 may have a first bent part, and second and third bent parts located at both sides of the first bent part. Accordingly, the data lines 152 and the second common lines 174 also have bent parts, in correspondence to the individual pixel areas, in parallel to pixel electrode 192.

Also, connection patterns 194 made of the same material as the pixel electrode 192 are formed on the second passivation layer, so that the connection patterns 194 contact the first common lines 126 and the common electrode 172 through the common contact holes 184 to electrically connect the first common lines 126 to the common electrode 172.

In the current embodiment, the first common lines 126 are formed in the first direction, and the second common lines 174 are formed in the second direction, however, the first common lines 126 may be omitted. In this case, the common contact holes 184 and the connection patterns 194 are also omitted. Also, the second common lines 174 may be formed in the first direction, in the second direction, or in the first and second directions.

Meanwhile, in the current embodiment, the common electrode 172 is formed over the entire surface of the substrate, and the pixel electrode 192 in the pixel area overlaps the common electrode 172, however, it is also possible for the common electrode 172 and the pixel electrode 192 each including a plurality of patterns to be alternately arranged in each pixel area.

Column spacers are formed on a color filter substrate in correspondence to the extensions of the second common lines 174 on the array substrate.

Figure 5:
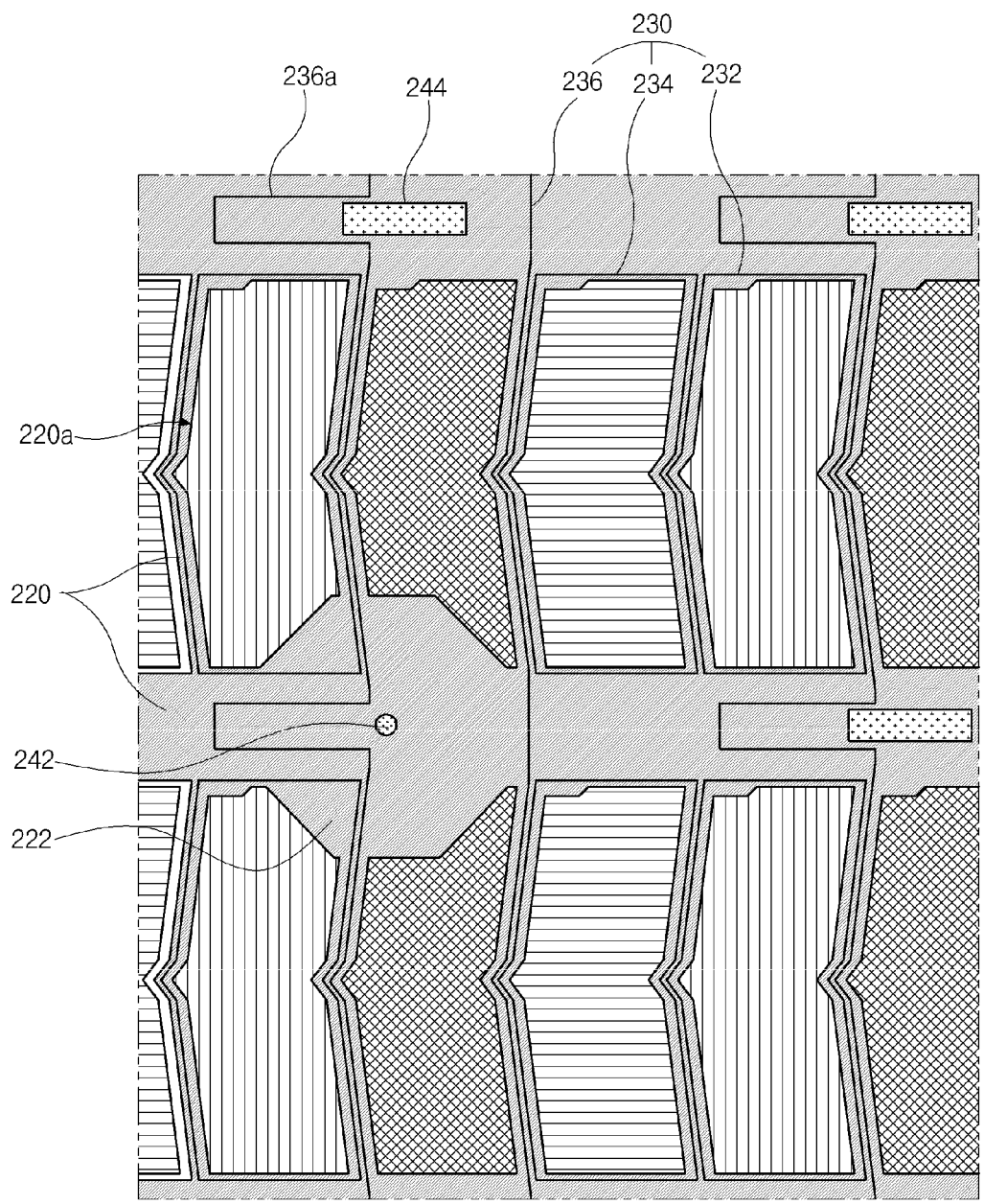
FIG. 5 is a top view of a color filter substrate of the liquid crystal display device according to the embodiment of the present invention.

FIG. 5 is a top view of the color filter substrate of the liquid crystal display device according to the embodiment of the present invention.

Referring to FIGS. 4 and 5, a black matrix 220 made of a material of reflecting or absorbing light is formed on an insulating substrate (not shown). The black matrix 220 has openings 220a in correspondence to the individual pixel areas, and includes first parts extending in the first direction and corresponding to the gate lines 122 and the first common lines 126, and second parts extending in the second direction and corresponding to the data lines 152 and the second common lines 174. Also, the black matrix 220 selectively includes protrusions 222, and the first parts have partially wide widths.

A color filter layer 230 is formed on the black matrix 220 in correspondence to the pixel areas. The color filter layer 230 includes red, green, and blue color filters 232, 234, and 236 that are sequentially arranged in the first direction, and each of the red, green, and blue color filters 232, 234, and 236 is located in correspondence to a pixel area. Each pixel area becomes a sub-pixel, and three sub-pixels corresponding to red, green, and blue color filters 232, 234, and 236, respectively, form a pixel.

Here, the red and green color filters 232 and 234 are separated for each pixel area, and the blue color filter 236 extends in the second direction to connect to another blue color filter 236 corresponding to a pixel area adjacent to the blue color filter 236 in the second direction. Meanwhile, the blue color filter 236 has a protrusion 236a that extends in the first direction between pixel areas adjacent to the blue color filter 236 in the second direction. The protrusion 236a is located in the first part of the corresponding black matrix 220.

Meanwhile, the openings 220a of the black matrix 220 and the red, green, and blue color filters 232, 234, and 236 also have bent parts at their left and right edges in correspondence to the data lines 152 and the second common lines 174.

An overcoat layer (not shown) for protection and flattening may be formed on the color filter layer 230, and the overcoat layer may be omitted.

First or second column spacers 242 and 244 are formed on the overcoat layer, in correspondence to the protrusions 236a of the blue color filters 236. Each of the first or second column spacers 242 or 244 is positioned in correspondence to a pixel. Each first column spacer 242 corresponds to a spacer for maintaining the gap between cells, and has a circular flat structure. Each second column spacer 244 corresponds to a spacer for preventing pressure, and has a bar-shaped flat structure. The width and length of the second column spacer 244 may be preferably longer than the diameter of the first column spacer 242.

Although not shown in FIG. 5, the height of the first column spacer 242 is higher than that of the second column spacer 244.

The first column spacers 242 are located in correspondence to the protrusions 222 of the black matrix 220. That is, the width of the black matrix 220 corresponding to the first column spacers 242 is wider than the width of the black matrix 220 corresponding to the second column spacers 244. Also, the arrangement density of the first column spacers 242 is lower than the arrangement density of the second column spacers 244.

Figure 6:
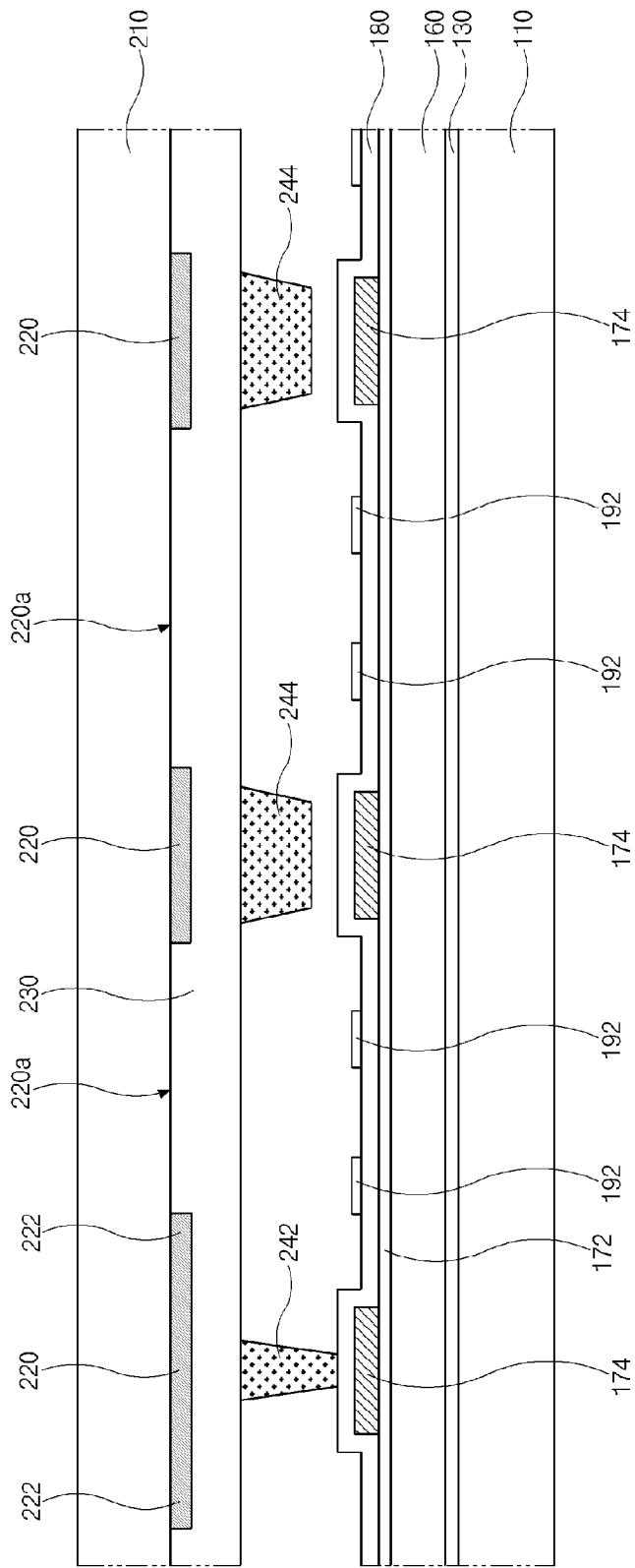
FIG. 6 is a cross-sectional view of the liquid crystal display device according to the embodiment of the present invention.

FIG. 6 is a cross-sectional view of the liquid crystal display device shown in FIGS. 4 and 5, according to the embodiment of the present invention, and shows a plurality of pixel areas by cutting the liquid crystal display device in the second direction.

As shown in FIG. 6, the first substrate 110 faces the second substrate 210 with a distance therebetween.

On the surface of the first substrate 110 facing the second substrate 210, a gate insulating layer 130 and a first passivation layer 160 are sequentially formed, and the common electrode 172 is formed on the first passivation layer 160. The first passivation layer 160 has a flat surface. The second common lines 174 are formed on the common electrode 172, and a second passivation layer 180 is formed on the second common lines 174. The pixel electrode 192 is formed in each pixel area between the second common lines 174 on the second passivation layer 180.

The second common lines 174 may be extensions as mentioned above with reference to FIG. 4, and data lines (152 of FIG. 4) or thin film transistors (T of FIG. 4) may be positioned below the second common lines 174.

Although not shown in FIG. 6, a first alignment layer is formed on the pixel electrode 192.

The black matrix 220 is formed on the surface of the second substrate 210 facing the first substrate 110. The black matrix 220 has openings in correspondence to the pixel areas. Some of the black matrix includes the protrusions 222 to have a wider width than the other black matrix 220.

The color filter layer 230 is formed on the black matrix 220, in correspondence to the openings 220a. The color filter layer 230 shown in FIG. 6 is a blue color filter, which extends in the second direction to connect to another blue color filter corresponding to a next pixel area, and corresponds to a portion of the blue color filter having the protrusion.

The first column spacers 242 or the second column spacers 244 are formed on the color filter layer 230, in correspondence to the black matrix 220. The first column spacers 242 are positioned in correspondence to the protrusions of the black matrix 220. The heights of the first column spacers 242 are higher than those of the second column spacers 244, and the widths of the first column spacers 242 are narrower than those of the second column spacers 244.

Although not shown in FIG. 6, an overcoat layer may be formed between the color filter layer 230 and the first and second column spacers 242 and 244, and a second alignment layer may be formed between the overcoat layer and the first and second column spacers 242 and 244 or on the first and second column spacers 242 and 244. A liquid crystal layer may be located between the first alignment layer and the second alignment layer.

The first column spacers 242 contact the second passivation layer 180 over the second common lines 174 of the first substrate 110, and the second column spacers 244 are spaced apart from the second passivation layer 180. The first column spacers 242 contact the first alignment layer.

Figure 7A:
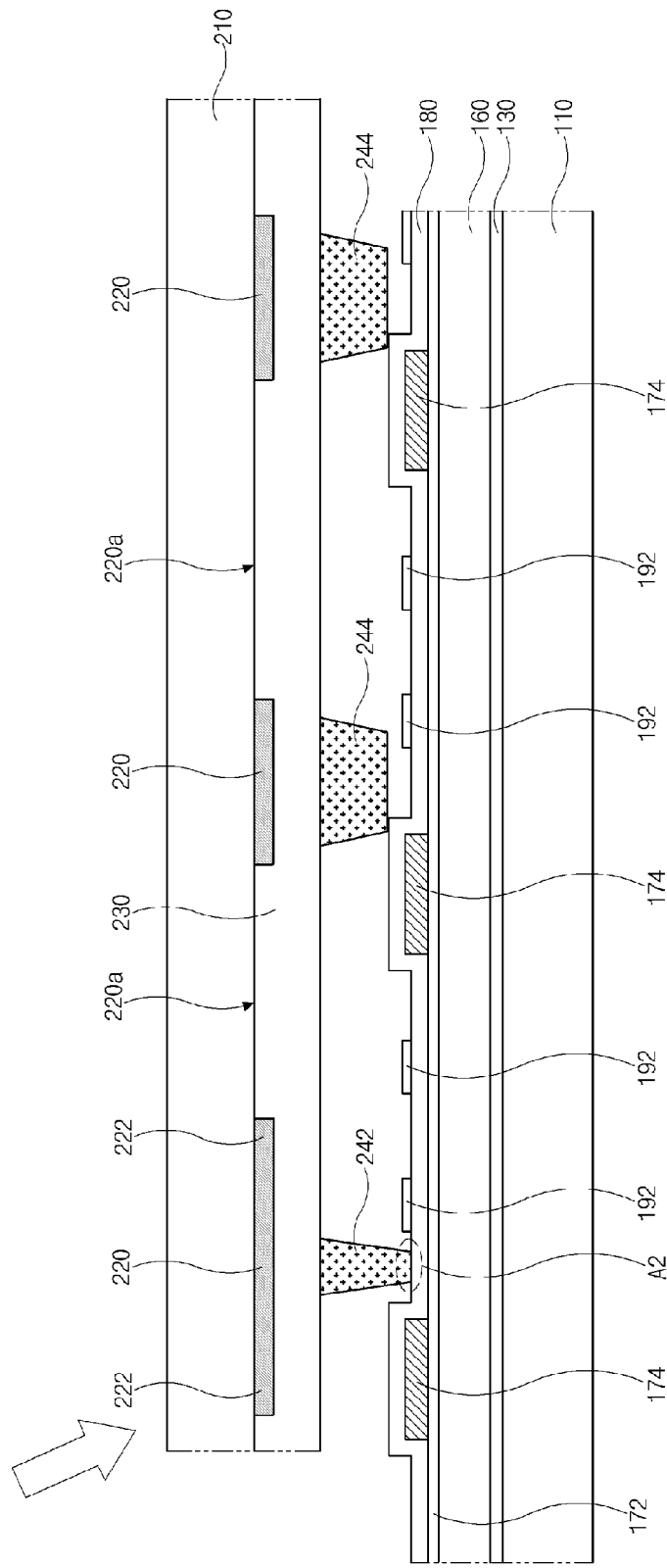
FIGS. 7A and 7B are cross-sectional views of the liquid crystal display device according to the embodiment of the present invention when an external force is applied to the liquid crystal display device and after the applied external force is removed.
Figure 7B:
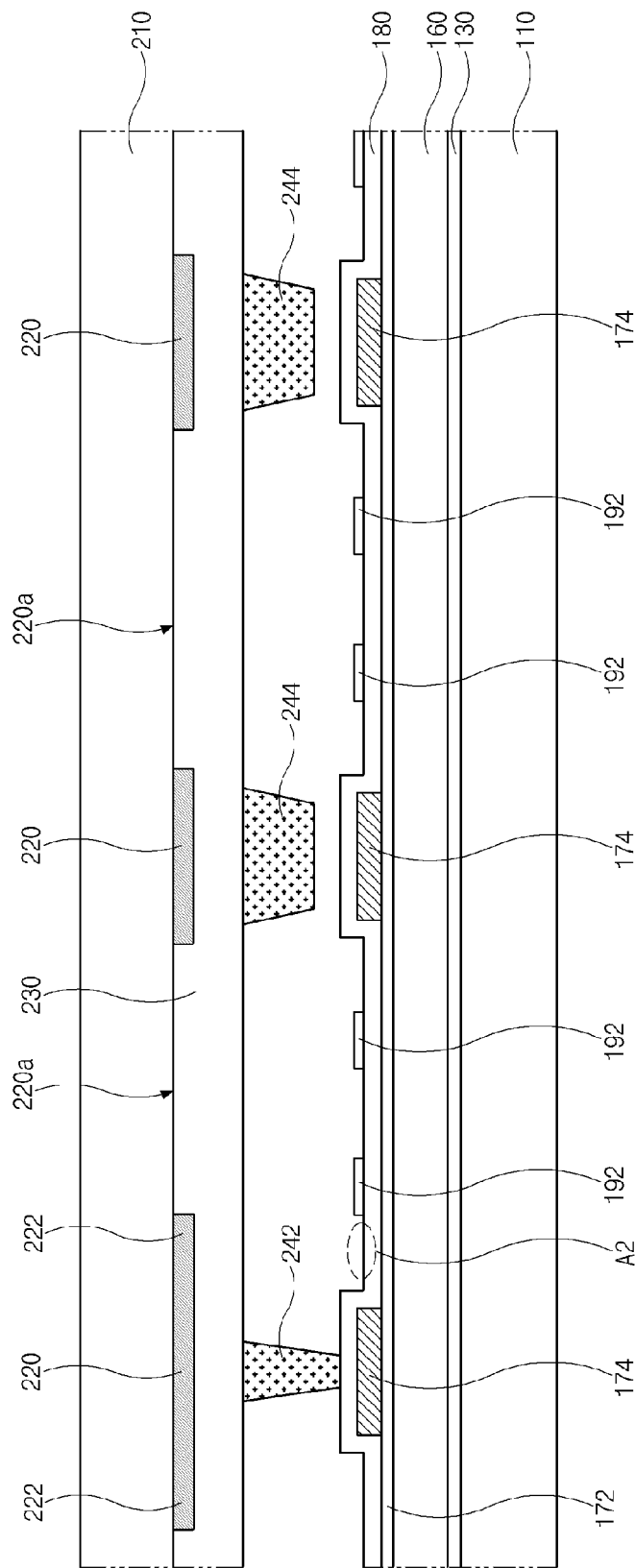

FIGS. 7A and 7B are cross-sectional views of the liquid crystal display device according to the embodiment of the present invention when an external force is applied to the liquid crystal display device and after the applied external force is removed.

As shown in FIG. 7A, when an external force represented by an arrow in FIG. 7A is applied to the liquid crystal display device, the upper second substrate 210 moves to the right with respect to the lower first substrate 110. At this time, the first and second column spacers 242 and 244 on the second substrate 210 also move to the right, so that the first column spacers 242 contact the first alignment layer (not shown) of the pixel areas, and the second column spacers 244 contact the second passivation layer 180 over the second common lines 174, in more detail, the first alignment layer over the second common lines 174 to be supported by the first alignment layer over the common lines 174 prevents contact with the first alignment layer in the pixel areas.

The first and second alignment layers are rubbed or optically aligned in a predetermined direction, and due to the contact with the first column spacers 242, the alignment of the first alignment layer changes at the contact area A2 so that the contact area A2 has different alignment from the other area.

Then, as shown in FIG. 7B, after the external force is removed, the upper second substrate 210 moves to the left with respect to the lower first substrate 110 and returns to its original state. Since the contact area A2 of the first alignment layer has different alignment from the other area, liquid crystal molecules over the contact area A2 are aligned differently from liquid crystal molecules over the other area to thus change transmittance of light. However, since the contact area A2 is covered by the protrusions 222 of the black matrix 220, it is possible to prevent light leakage due to the contact area A2 when a black image is displayed.

Meanwhile, since the contact area A2 is made only by the first column spacers 242, the protrusions 222 are formed only in the black matrix 220 corresponding to the first column spacers 242. Also, by making the arrangement density of the first column spacers 242 lower than that of the second column spacers 244, the entire area of the black matrix 220 can be prevented from increasing so that an aperture ratio can increase.

As described above, the second common lines 174 may be formed in the first or second direction or in the first and second directions. If the second common lines 174 are formed in the first direction, each second column spacer 244 has a bar shape extending in the second direction, whereas if the second common lines 174 are formed in the second direction, each second column spacer 244 has a bar shape extending in the first direction.

In the current embodiment, the first and second column spacers 242 and 244 are formed on the flat first passivation layer 160, in correspondence to the second common lines 174. However, it is also possible for the first and second column spacers 242 and 244 to be located in shielding areas in which no image is displayed, and formed in correspondence to a pattern capable of making a step height. If no flat insulating layer is formed, the pattern capable of making the step height may be the data lines 152 or the thin film transistors T.

Figure 8:
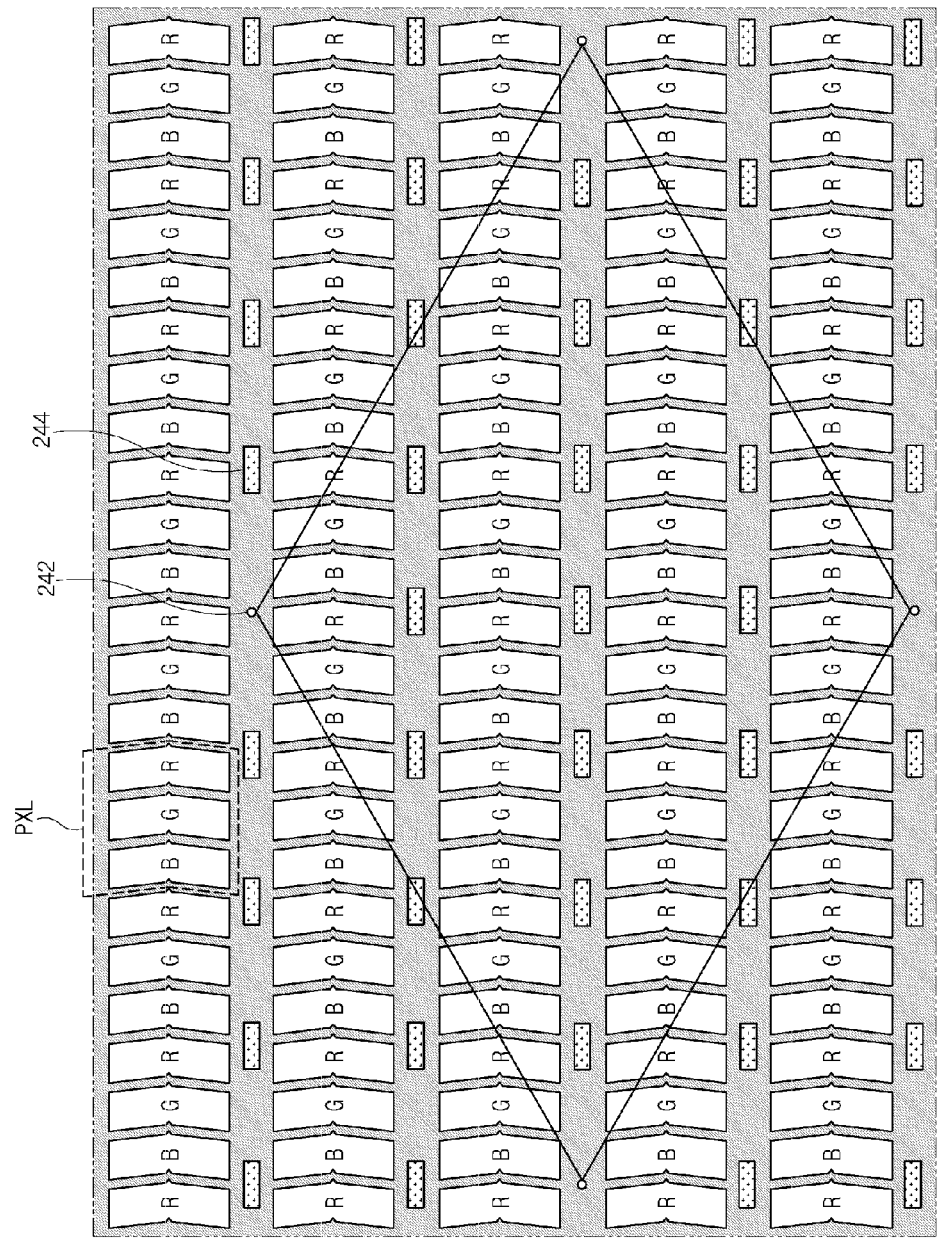
FIG. 8 shows the arrangement densities of first and second column spacers in the liquid crystal display device according to the embodiment of the present invention.

FIG. 8 shows the arrangement densities of the first and second column spacers 242 and 244 in the liquid crystal display device according to the embodiment of the present invention.

As shown in FIG. 8, red, green, and blue sub-pixels R, G, and B form a pixel PXL, and a first column spacer 242 or a second column spacer 244 is arranged for each pixel PXL.

The arrangement density of the first column spacers 242 is lower than the arrangement density of the second column spacers 244. For example, a first column spacer 242 may be arranged every 8 pixels in the first direction and may be arranged every 4 pixels in the second direction.

As described above, in the color filter substrate and the liquid crystal display device including the same, the first column spacers for maintaining the gap between cells and the second column spacers for preventing pressure are formed in correspondence to the step height units of the array substrate, and the width of only the black matrix corresponding to the first column spacers increase. Accordingly, when the first and second column spacers move by an external force, light leakage due to the first column spacers is blocked by the black matrix. Since the second column spacers are supported by the step height units, the alignment layer is not damaged, thereby preventing light leakage when a black image is displayed.

Also, by making the arrangement density of the first column spacers lower than that of the second column spacers, it is possible to limit the number of portions of the black matrix having wide widths, resulting in improvement of an aperture ratio and brightness.

It will be apparent to those skilled in the art that various modifications and variations can be made in a display device of the present disclosure without departing from the spirit or scope of the invention. Thus, it is intended that the present invention covers the modifications and variations of this invention provided they come within the scope of the appended claims and their equivalents.

What is claimed is:

1. A liquid crystal display device comprising:
a first substrate and a second substrate in which a plurality of pixel areas are defined, wherein the first substrate faces and is spaced apart from the second substrate;
a plurality of patterns on an inner surface of the first substrate facing the second substrate, and making a step height;
an insulating layer on the plurality of patterns;
a black matrix on the surface of the second substrate facing the first substrate, and having a plurality of openings corresponding to the pixel areas;
a color filter layer on the inner surface of the second substrate facing the first substrate, and including a red color filter, a green color filter, and a blue color filter that are sequentially arranged in a first direction in correspondence to the pixel areas; and
a plurality of first column spacers and a plurality of second column spacers over the black matrix, and having different heights,
wherein each first column spacer contacts the insulating layer over one of the patterns, each second column spacer is spaced apart from the insulating layer over another one of the patterns, and an arrangement density of the first column spacers is lower than an arrangement density of the second column spacers,
wherein the liquid crystal display device further comprises:
a plurality of gate lines and a plurality of data lines on an inner surface of the first substrate facing the second substrate and crossing each other to define the pixel areas;
a thin film transistor connected to each of the gate lines and the data lines;
a first passivation layer on the thin film transistor, and having a flat surface;
a common electrode on the first passivation layer over a substantially entire surface of the first substrate;
a plurality of common lines on the common electrode;
a second passivation layer on the common lines; and
a pixel electrode in each pixel area on the second passivation layer, overlapping the common electrode, and including a plurality of pixel patterns,
wherein the plurality of patterns are the common lines.

2. The liquid crystal display device of claim 1, wherein the common lines have protrusions in correspondence to the first column spacers.

3. The liquid crystal display device of claim 1, wherein a width of the black matrix corresponding to the first column spacers is wider than a width of the black matrix corresponding to the second column spacers.

4. The liquid crystal display device of claim 1, wherein each first column spacer has a circular flat structure, and each second column spacer has a bar-shaped flat structure.

5. The liquid crystal display device of claim 1, wherein the blue color filter has a protrusion that extends in the first direction and is disposed between pixel areas next to the blue color filter and adjacent to each other in a second direction, and the protrusion corresponds to one of the first column spacers and the second column spacers.

6. The liquid crystal display device of claim 5, wherein blue color filters corresponding to pixel areas adjacent to each other in the second direction are connected to each other.

* * * * *